United States Patent
Brun

(10) Patent No.: US 7,004,845 B2
(45) Date of Patent: Feb. 28, 2006

(54) MANUFACTURING PROCESS OF A CLINCH NUT AND CLINCH NUT ACHIEVED BY SUCH A PROCESS

(75) Inventor: Patrice Brun, Saint Cassin (FR)

(73) Assignee: Bollhoff Otalu s.a., La Ravoire (FR)

( * ) Notice: Subject to any disclaimer, the term of this patent is extended or adjusted under 35 U.S.C. 154(b) by 29 days.

(21) Appl. No.: 10/786,138

(22) Filed: Feb. 26, 2004

(65) Prior Publication Data

US 2004/0192452 A1 Sep. 30, 2004

(30) Foreign Application Priority Data

Mar. 24, 2003 (FR) .................................. 03 03555

(51) Int. Cl.
*B21D 53/24* (2006.01)
(52) U.S. Cl. .............................. 470/25; 470/20; 470/21
(58) Field of Classification Search .................. 470/18, 470/19, 20, 21, 25; 411/179, 180, 183, 427
See application file for complete search history.

(56) References Cited

U.S. PATENT DOCUMENTS

| 2,253,765 | A | * | 8/1941 | Cox ............................ 470/91 |
| 3,279,304 | A | | 10/1966 | Hopkins |
| 5,213,460 | A | | 5/1993 | Sadri et al. |
| 5,282,698 | A | * | 2/1994 | Wright et al. ............ 405/259.6 |
| 6,702,536 | B1 | * | 3/2004 | Nilsen ........................ 411/171 |
| 6,761,520 | B1 | * | 7/2004 | Dise ............................ 411/38 |

FOREIGN PATENT DOCUMENTS

WO WO 02/38329 A1 5/2002

* cited by examiner

*Primary Examiner*—Ed Tolan
(74) *Attorney, Agent, or Firm*—Oliff & Berridge, PLC

(57) ABSTRACT

A manufacturing process of a clinch nut consists in forming a recess zone in a rough casting by cold heading so as to obtain a rough part. The rough part then undergoes a thermal annealing treatment followed by a cold heading operation enabling a bore to be formed designed to contain an internal thread. The internal thread is preferably achieved by tapping by upsetting material from the bore of the nut.

10 Claims, 3 Drawing Sheets

MANUFACTURING PROCESS OF A CLINCH NUT AND CLINCH NUT ACHIEVED BY SUCH A PROCESS

BACKGROUND OF THE INVENTION

The invention relates to a manufacturing process of a clinch nut comprising at least the following successive steps:
- a rough metal casting is cut and deformed by cold heading so as to form a rough part comprising at least a recess zone,
- a bore adjacent to the recess zone is formed by cold heading,
- an internal thread is made in the bore.

The invention also relates to a clinch nut achieved by such a process.

STATE OF THE ART

Clinch nuts comprise a sufficiently plastic and ductile recess zone to be deformed symmetrically when the nut is fitted on a fixing element and a sufficiently resistant tapped zone to be able to withstand the loads applied by a screw without being deformed, the screw being screwed into the tapped zone of the nut so as to secure a part onto the fixing element.

It is known to perform thermal treatment by annealing to make the recess zone more ductile and more plastic than the rest of the clinch nut. Thus the document WO 02/38329 describes a manufacturing process of a clinch nut in which localized annealing is performed on an appropriate part of the nut to improve its deformation during its fitting. This document also mentions the possibility of achieving the shape of the clinch nut by continuous cold forming and of performing annealing before forming the internal thread (FIG. 1). Performing the internal threading operation after annealing enables the threaded zone to be hardened locally by cold working effect. The thread of these clinch nuts is however not sufficiently resistant for certain applications in automobile structures or safety elements in a car for example. They are not in fact compatible with certain classes of screws referenced by the ISO 898-1 standard.

OBJECT OF THE INVENTION

The object of the invention is to achieve a clinch nut comprising a tapped zone able to withstand high loads without deforming while keeping a ductile and plastic recess zone.

According to the invention, this object is achieved by the fact that the rough part undergoes a thermal annealing treatment between formation of the recess zone and formation of the bore.

According to a development of the invention, the rough part is achieved by stamping then by extrusion.

According to a preferred embodiment, the bore is achieved by extrusion.

According to another feature of the invention, the internal thread is achieved by tapping by material upsetting.

An object of the invention is also to achieve a clinch nut achieved by a manufacturing process described above and comprising a tapped zone and a recess zone, the ratio of the Vickers hardness of the recess zone over the Vickers hardness of the tapped zone being substantially comprised between 0.40 and 0.75.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

Figure 1:
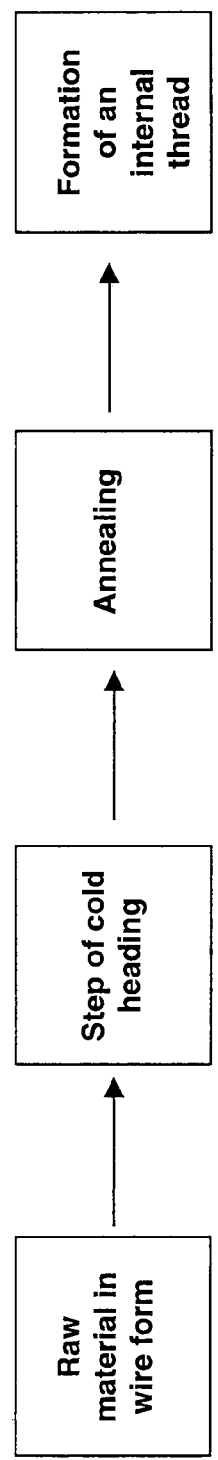
FIG. 1 is a schematic representation of a manufacturing process of a clinch nut according to the prior art.
Figure 2:
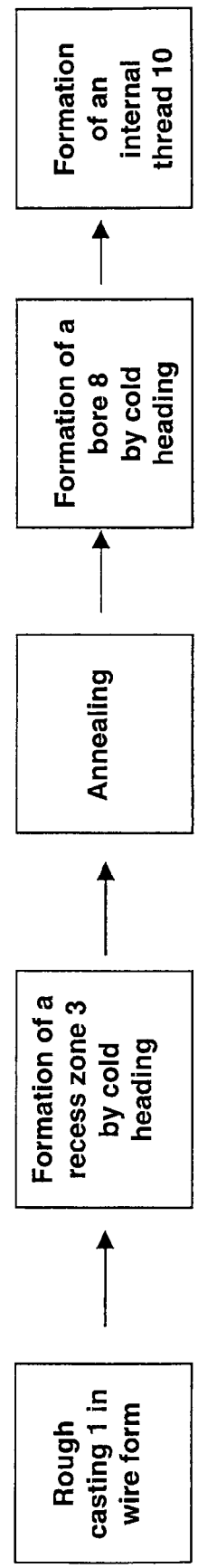
FIG. 2 is a schematic representation of a manufacturing process of a clinch nut according to the invention.
Figure 3:
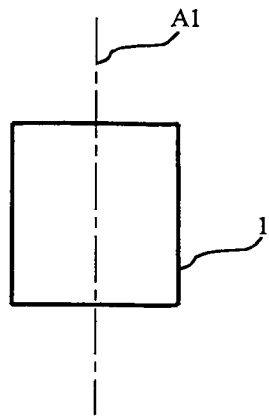
FIGS. 3 to 6 represent, in cross-section, different steps of the manufacturing process according to FIG. 2.

As represented in FIG. 2, a manufacturing process of a clinch nut, preferably of a countersunk clinch nut, consists in forming a recess zone 3 in a rough metal casting 1, for example a round wire, by cold heading so as to obtain a rough part or a blank. The rough part then undergoes thermal annealing treatment followed by a cold heading operation enabling a bore 8 to be formed designed to contain an internal thread 10. The internal thread 10 is preferably achieved by tapping by upsetting material from the bore 8 of the rough part. The cold heading operation, in the manufacturing process represented in FIG. 2, is discontinuous, an anneal being performed before formation of the bore and after formation of the recess zone, whereas the manufacturing process represented in FIG. 1 consists in achieving the recess zone and bore in the same continuous cold heading operation.

According to a particular embodiment represented in FIGS. 3 to 6, the rough casting 1 is cylindrical with an axis of symmetry A1 (FIG. 3), and it is preferably made of steel, stainless steel, aluminium or brass. It is cut and deformed in several successive steps by cold heading on a cold heading machine so as to form the recess zone 3. What is meant by cold heading is an operation enabling a rough casting to be deformed cold or "semi-hot", unlike hot deformation for which the rough casting is heated to go through an intermediate pasty state (situated before the melting point for metals) so as to make it more malleable to deform it. The stainless steel rough casting thus undergoes a semi-hot heading operation.

Figure 4:
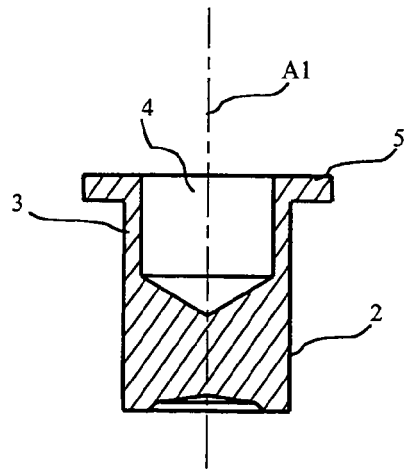

For example purposes, in the course of the cold heading operation, a stamping step then an extrusion step enable a rough part 2 to be achieved comprising, in the upper part thereof, the recess zone 3 and a cavity 4 opening out onto the top end of the rough part 2 (FIG. 4). By deforming the rough casting, an outwardly salient peripheral rim is formed at the top end of the rough part 2. This peripheral rim is then calibrated to form the head 5 of the clinch nut. In FIG. 4, the head 5 of the clinch nut is formed during the cold heading operation designed to form the recess zone 3. The shape of the head 5 can be flat, fine, milled, reduced or any other shape.

Figure 8:
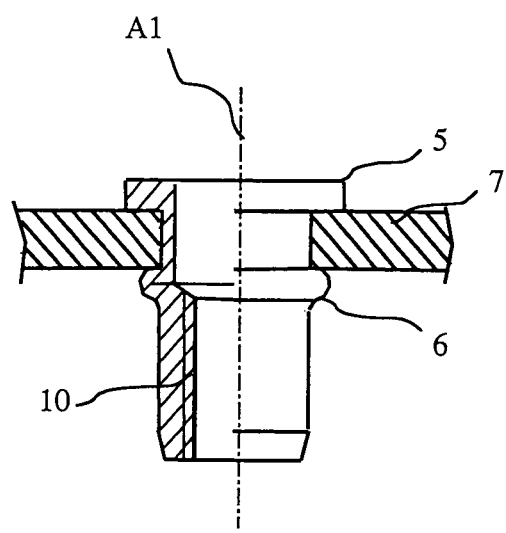
FIG. 8 is a partial cross-sectional view of a clinch nut according to the invention fitted on a fixing element.

As the result of cold heading is to harden the recess zone 3 by cold working effect, the rough part 2 is subjected to thermal annealing treatment which enables the recess zone to be made ductile and plastic. When the clinch nut is used, the recess zone 3 can then be deformed symmetrically under the action of an axial force applied by a fitting tool. The recess zone 3 is deformed into a bead 6 which holds the head 5 of the clinch nut against a fixing element 7 which can for example be made of metal or plastic material (FIG. 8). For example, thermal annealing treatment is performed at a temperature of about 800° C. in a furnace for a steel clinch nut.

Figure 5:
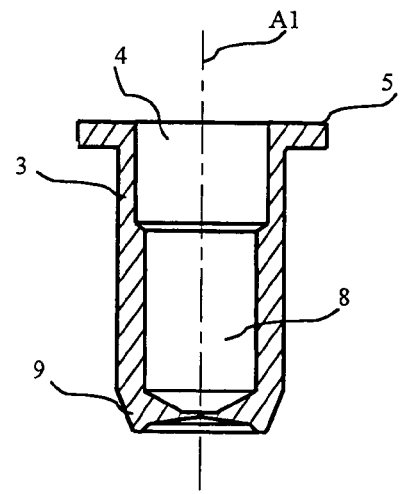
Figure 6:
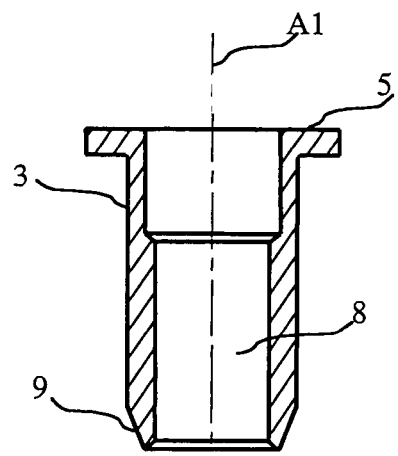

Once the rough part 2 has been cooled, it is placed back on a finishing machine which may be a cold heading machine so as to form, by cold heading, a bore 8 adjacent to the recess zone 3 and extending the cavity 4 coaxially (FIG. 5) in the bottom part of the rough part 2. This has the effect of hardening the bore 8 locally by cold working effect. The bore 8 and recess zone 3 form the shank of the clinch nut. The bore 8 is preferably achieved by extrusion then by drilling the bottom of the shank of the nut (FIG. 6) so as to form an open shank. In FIGS. 5 and 6, the free end of the shank comprises a tapered chamfer 9 making an angle of about 15° with the axis of symmetry A1 of the nut. The shank can also be blind and in this case the drilling operation is not performed.

Figure 7:
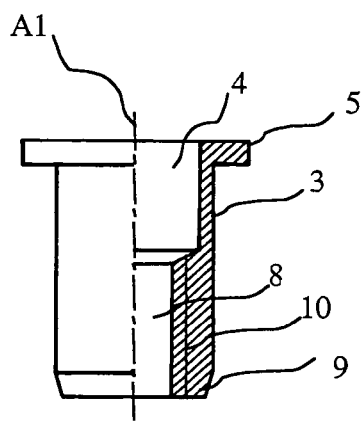
FIG. 7 represents, in partial cross-section, a clinch nut obtained by a manufacturing process according to the invention.

The internal thread 10 is then formed by tapping by upsetting material from the bore 8 of the clinch nut. Formation of the internal thread 10 enables the bore 8 to be hardened locally, by cold working effect, while preserving the ductility and plasticity of the recess zone 3. The clinch nut thus formed (FIG. 7) can then undergo surface treatment which is preferably an anti-corrosion treatment.

A clinch nut achieved by such a process comprises a tapped zone formed by the bore 8 and the internal thread 10 and having a much greater hardness than that of the recess zone 3. The ratio of the Vickers hardness of the recess zone 3 of the nut over the Vickers hardness of the tapped zone is thus substantially comprised between 0.40 and 0.75. The hardness of the tapped zone is then 1.33 to 2.5 times greater than that of the recess zone 3, the ratio varying according to the composition and type of nut achieved.

For comparison purposes, hardness tests were performed for nuts of M6 type according to the ISO 898-2 standard, made of standard steel and manufactured according to the process described in FIG. 1 and by the manufacturing process according to the invention (FIG. 2). The mean ratio of the Vickers hardness of the recess zone 3 over the Vickers hardness of the tapped zone is, in the case of the nuts manufactured according to the prior art, substantially 0.8 whereas, for nuts manufactured according to the invention, the mean ratio is substantially 0.55. Likewise, for M6 type aluminium nuts, the hardness ratio is 0.95 for the process according to the prior art and 0.72 for the process according to the invention.

Hardness tests were also performed for M8 and M10 type steel nuts, achieved by a process according to the prior art and by a process according to the invention described in FIG. 2. For the M8 type nuts, the mean ratio of the hardness of the recess zone 3 over the hardness of the tapped zone is 0.8 for the process according to the prior art and 0.5 for the process according to the invention. For the M10 type nuts, the mean ratio of the hardness of the recess zone 3 over the hardness of the tapped zone is 0.72 for the process according to the prior art and 0.53 for the process according to the invention. For M12 type nuts, the mean ratio of the hardness of the recess zone 3 over the hardness of the tapped zone is 0.97 for the process according to the prior art and 0.59 for the process according to the invention. For the different types of nuts, the gain in hardness obtained for the tapped zone of a clinch nut achieved according to the invention in comparison with the recess zone of the nut is greater than that obtained for a clinch nut achieved according to the prior art.

The clinch nut achieved by such a process can thus be used with screws of higher quality. A steel clinch nut achieved by such a process is compatible at least with a 10.9 screw according to the ISO 898-1 standard whereas a steel clinch nut achieved by a process according to the prior art is only compatible with an 8.8 screw. Likewise, aluminium and brass screws achieved by a process according to the invention are respectively compatible at least with 6.8 and 8.8 screws according to the ISO 898-1 standard whereas aluminium and brass screws achieved by a process according to the prior art are compatible with screws of lower classes, and in particular with 4.8 and 6.8 screws.

The invention is not limited to the embodiments described above. The head 5 of the clinch nut can for example be formed during formation of the bore 8 instead of being achieved during formation of the recess zone 3. The shank of the clinch nut can be of any type, in particular cylindrical, smooth or knurled or of polygonal cross-section.

What is claimed is:

1. Manufacturing process of a clinch nut comprising at least the following successive steps:
    a rough metal casting is cut and deformed by cold heading so as to form a rough part comprising at least a recess zone;
    a bore adjacent to the recess zone is formed by cold heading; and
    an internal thread is made in the bore,
    wherein the rough part undergoes a thermal annealing treatment between formation of the recess zone and formation of the bore.

2. Process according to claim 1, wherein the rough part is achieved by stamping then by extrusion.

3. Process according to claim 1, wherein the bore is achieved by extrusion.

4. Process according to claim 3, wherein the bottom of the bore is drilled.

5. Process according to claim 1, wherein the internal thread is achieved by tapping by material upsetting.

6. Process according to claim 1, wherein the head of the clinch nut is formed during formation of the rough part.

7. Process according to claim 1, wherein the head of the clinch nut is formed during formation of the bore.

8. Process according to claim 1, wherein a surface treatment is performed after formation of the internal thread.

9. Process according to claim 8, wherein the surface treatment is an anti-corrosion treatment.

10. Process according to claim 1, wherein the rough metal casting is made of a material chosen from steel, aluminum or brass.

* * * * *